INVENTORS
FLORENS J. von DELDEN &
BY PETER N. WOOD
Marechal, Biebel, French & Bugg
ATTORNEYS

United States Patent Office 3,281,631
Patented Oct. 25, 1966

3,281,631
ELECTRIC MOTORS
Florens J. von Delden, Glendale, and Peter N. Wood, Torrance, Calif., assignors to The Lau Blower Company, Dayton, Ohio, a corporation of Ohio
Filed Mar. 2, 1964, Ser. No. 348,672
9 Claims. (Cl. 318—138)

This invention relates to electric motors and more particularly to transistorized brushless D.C. motors and control circuit therefor.

The relatively low cost, universal availability, and freedom from electrical noise of induction type A.C. motors has made their use appealing for direct current applications. For instance, the use of such induction motors would be advantageous for operating loads such as blowers directly from a D.C. source through a converter circuit which converts the direct current to alternating power for application to the stator windings. Frequently, it is desirable to operate the rotor at relatively high rotor speeds, or at definite and particular shaft speeds which speeds would not normally be obtainable from the common A.C. sources of supply.

Increasing the switching rate of the current applied to the stator of an induction motor to achieve high rotor speeds has the effect of reducing the starting torque and the locked rotor torque. It has been found that it is difficult to start an induction motor, such as a shaded pole motor, from a transistor converter circuit, operating at a relatively high frequency, due to the low starting torque.

The brushless D.C. motor control circuit described herein modifies the switching frequency during starting and run up so that a lower frequency is applied to the motor windings. This frequency is then gradually increased to the desired higher frequency for slip speed conditions. This is accomplished by a control which derives its input from the A.C. or square wave input to the motor, as a function of rotor speed. By providing a signal which is a function of the speed of the rotor, the switching frequency of the transistor converter circuit is controlled accordingly through a suitable control circuit. The same circuit is preferably used to decrease frequency of the inverter automatically with increasing slip, such as when the rotor is mechanically loaded. Thus, a shaded pole motor operating from the frequency controlled inverter circuit of this invention exhibits an almost linear torque speed characteristic, and the pull out or breakdown speed is forced down to a lower value than that at which pull out would normally occur without the frequency control.

It is therefore an important object of this invention to provide automatic frequency control and method for operating an induction motor directly from a D.C. source.

A further object of this invention is the provision of a control circuit for an induction motor which senses the stator current as an indication of rotor current, and by controlling the drive of the switching transistors, adjusts the point on the hysteresis curve at which the inverter switching occurs, and thereby changes the frequency of switching.

Another important object of this invention is the provision of an induction motor for direct current operation, and a converter control circuit and method therefor in which the inverter frequency is lowered whenever the input current rises above the no-load or the slip speed current, and therefore at starting, and when under load, a lower frequency is applied to the stator windings, and as the motor accelerates or the load decreases, the frequency is automatically increased to a desired maximum frequency at slip speed condition.

A further object of this invention is the provision of a frequency controlled induction motor which has an improved torque curve and greater starting torque as compared to a motor without such frequency control.

A still further object of this invention is the provision of a static inverter circuit control for an induction motor for improving the starting characteristics and for reducing the r.p.m. at which the motor torque breaks down, as compared to the starting characteristics and the breakdown point of the induction motor when operating from an ordinary inverter.

Another object of this invention is the provision of a control circuit for static inverter for operating an induction motor on a direct current which provides a signal proportional to rotor speed and which controls the switching rate of the converter circuit in proportion to such speeds for the purpose of decreasing the switching rate with decreasing rotor speed.

These and other objects and advantages of the invention will be apparent from the following description, the accompanying drawings and the appended claims.

Figure 1:
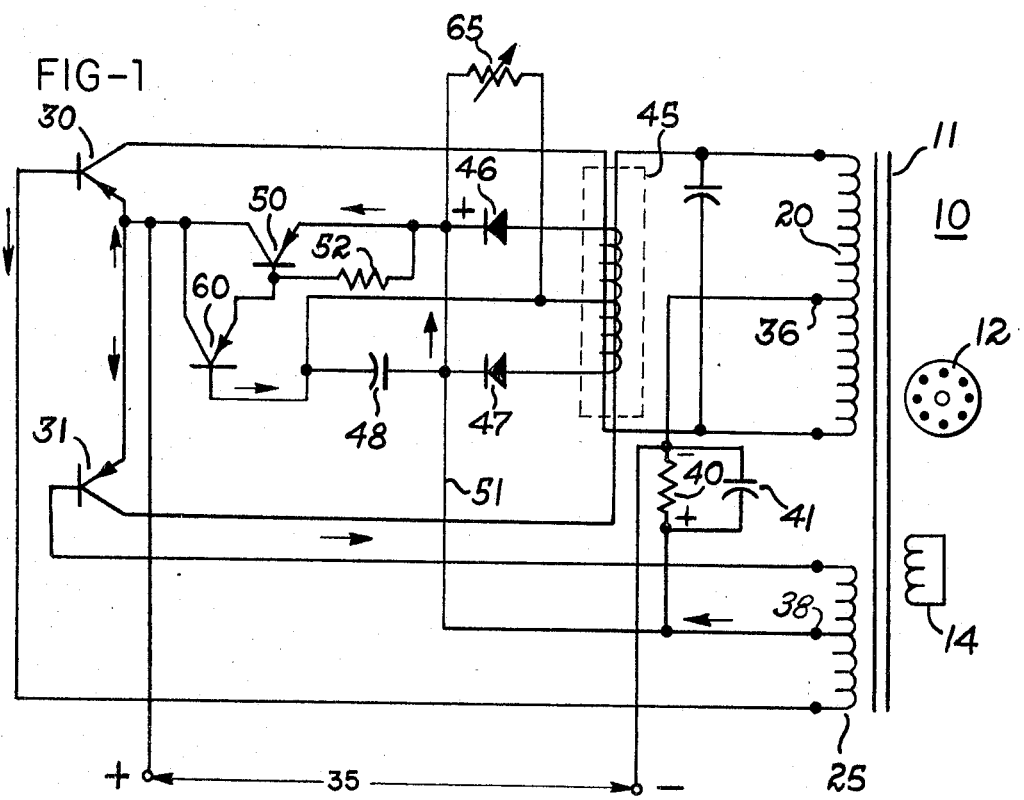
FIG. 1 is an electrical wiring diagram of a transistorized induction motor and static inverter circuit for such motor according to this invention.

Referring to the figures of the drawing, which show a preferred embodiment of the invention, an induction motor is shown at 10 as having a stator 11 and a rotor 12. The induction motor may be of any suitable type, such as split phase, capacitor, or shaded pole, and the motor 10 is shown herein as a shaded pole motor having a shading winding 14 for each of the poles thereof.

It is to be understood that the invention is not limited to the particular type of induction motor or rotor shown. For instance, the rotor may be of the squirrel cage type, or wire wound, or of any other type. However, the invention is particularly useful for use with fractional horsepower, shaded pole, squirrel cage, motors for improving the starting torque and for lowering the breakdown speed and increasing torque at breakdown, and is thus particularly useful for application to such induction motors for operation from a D.C. source where the motors are to be started under load.

A center tapped winding 20 is wound on the stator core 11. The stator winding 20 is driven by a static inverter circuit which transforms a D.C. power source into a square wave. Also, a feed back or control winding 25, which is also center tapped, is wound in magnetically coupled relation to the stator 11. Drive means for the stator winding 20 consists of a pair of power transistors 30 and 31 which are connected in push-pull arrangement to the winding 20. The transistors 30 and 31, as shown, are PNP type, which have their collectors connected respectively to the opposite ends of the winding 20 and which have their emitters connected in common with each other and with a direct current voltage source 35. Thus, the positive terminal of the D.C. input source, which may be twelve volts, is connected to the emitters of the power transistors 30 and 31, and the negative pole is connected directly to this center tap 36 of the stator winding 20.

The bases of the transistors 30 and 31 are connected respectively to the opposite ends of the control winding 25, for control thereby. The center tap 38 of the control winding 25 is connected to the negative terminal of the power supply through a biasing resistor 40 which is by-passed by a capacitor 41.

The circuit which has been described thus far consists of a generally conventional transistor inverter circuit, which may be likened to a conventional static inverter circuit, for the purpose of understanding the principles of operation. It has been found preferable to use transistors of relatively high beta as compared to transistors of low beta for improved cold starting characteristics. The transistors 30 and 31 are operated in the saturated mode and the switching of the transistors is accomplished by the control winding 25. The switching occurs with the saturation of the core 11 which is accompanied by a collapse in the induction reactance of the stator winding 20 resulting in a decrease in the flux within the core 11 resulting in a reversal of the flux within the control winding 25. This has the effect of cutting off the conducting transistor and causing the non-conducting transistor to conduct. In this manner, the switching occurs at a frequency which is determined by the saturation characteristics of the core, by the constants of the circuit and the voltage applied to the stator windings.

Although such conventional static inverter circuits have found general acceptance for use with transformers, they have found very little use with induction motors for operating such motors from a D.C. source by reason of certain inherent differences in operation between an induction motor and a transformer. Typical converter circuits for transformers are described, for instance, in United States patents to Schultz 2,931,991 of April 5, 1960 and Royer et al. 2,849,614 of 1958. However, the induction motor does not correspond directly to a transformer, when the variable shaft speeds are considered. Thus, the load on a motor consists of an external mechanical load, which is driven by the motor shaft, as distinguished from a resistance load connected to an appropriate secondary winding of the transformer. The loads are similar only to the extent that they are fed from a secondary winding, which in this case, is a rotor. Furthermore, the electrical load impedance, which is presented by a rotor to the stator, is not constant, but varies in proportion to the speed of rotation, in conjunction with the rotor resistance. Thus, at locked rotor condition, the load presented is essentially a low resistance and results in a high current in the stator. The impedance increases with speed until at slip speed, the load is almost a pure inductance resulting in a lower stator current flow with a relatively poor power factor.

Figure 2:
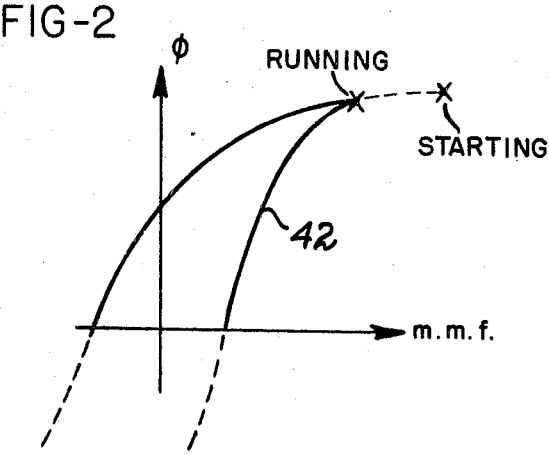
FIG. 2 is a diagram of the hysteresis curve showing different conditions of operation of the invention.

FIGURE 2 shows a typical hysteresis curve 42 for a stator core of the type of core material preferably used. The stator cores are preferably made of silicon steels which do not exhibit a square hysteresis curve, such as some nickel-iron alloys having a low core loss. With such materials there is no definite point on the curve at which the core may be considered as being saturated. Due to the somewhat undefined magnetic saturation level of the core, the frequency of oscillation is determined by the combined ampere-turns required to saturate the core and also to supply the extra rotor current at speeds less than slip speeds. The rotor current, therefore, largely controls the oscillation frequency of the inverter. Thus it can be seen that at stall, the inverter without frequency control supplies a higher frequency than it does at slip speed. This frequency characteristic is just the opposite of that required for good starting and run up torque.

This invention therefore provides an automatic frequency control circuit which provides a signal proportional to rotor speed by sensing the input current to the stator windings. By controlling the base current to the transistors, the point on the hysteresis curve is controlled at which the inverter switches. By this method, the inverter frequency is lowered whenever the input current rises above the no-load slip speed current, and thus at starting, a lower frequency is fed to the motor and as the rotor accelerates, the frequency is automatically adjusted to the mechanical loading of the motor. Typically, the frequency of switching at stall may be seventy-five percent of the switching frequency at no-load.

The control circuit is shown in FIG. 1 as including a current transformer 45 which may consist of turns of wire magnetically coupled directly to the leads between the power transistors 30 and 31 and the stator winding 20, as shown. The current transformer 45 provides the means for producing a signal which is in response to or which is proportional to rotor speed by measuring the current in the stator windings. The voltage output of the current transformer 45 is essentially a square wave, the amplitude of which varies directly with the current drawn by the motor. This wave form is converted to a D.C. level by diodes 46 and 47, and filtered by a capacitor 48. Thus, the transformer 45 and the rectifiers consisting of the diodes 46 and 47 provide a varying D.C. voltage which is proportional to motor current, and is therefore proportional to the current within the rotor 12 and is a function of rotor speed. Actually, the signal produced is proportional to rotor slip and is inversely proportional to actual speed.

The frequency control circuit further includes a PNP transistor 50, which comprises a control transistor effectively in the base circuit of the push-pull transistors 30 and 31 for effecting variations in the current through the bases of these transistors. The output of the diodes 40 and 46 is applied to the transistor 50. The conduction of transistor 50, being connected electrically between the emitters of the transistors 30 and 31, and the bias resistor 40, by a lead 51, causes more drive current to flow into the transistors 30 and 31. Resistor 52 is a bias resistor for the transistor 50.

Means for varying the effect of the frequency control transistor 50 by controlling the conduction includes a further PNP transistor 60 which is connected in cascade with the base of the transistor 50 and which, in turn, has its base connected to the center tap of the current transformer 45. The control transistor 60 thus responds to the D.C. signal from the transformer 45. It will therefore be seen that on starting of the motor where a high input current flows, the control signal at the diodes is high and transistor 60 conducts permitting transistor 50 to conduct into saturation. The conduction of transistor 50 causes more drive current to flow into the transistors 30 and 31 which allows the stator core of the motor to be driven further into magnetic saturation, as shown in FIG. 2.

Under these conditions, the switching rate frequency is decreased. In other words, at any given excitation voltage, the volts-amperes-seconds necessary to produce a given induction level depends only upon current. Therefore, an increase in current will increase the magnetic induction and hence more time will be required to reach the new flux density. This means a longer time period before the transistors are forced to switch due to the excessive collector current at saturation, and therefore a lower switching frequency will result.

During run up of the motor, the current drawn by the motor decreases, and hence the rotor current decreases, and transistor 50 gradually conducts less and less current and the inverter transistors 30 and 31 receive less drive, and the frequency increases. At slip speed with no load on the motor, the frequency is at a maximum and the speed therefore is highest. However, if a load is now presented to the motor, the frequency of the inverter will automatically decrease to provide the extra torque required and to reduce the breakdown or pull out speed.

Means for effecting some frequency control of the final slip speed comprises a variable resistor 65 which is connected between the center tap of the transformer 45 and the output of the diodes 46 and 47. The variable resistor 65 forms a constant impedence load to the current transformer 45 and therefore provides direct control of the base voltage of the control transistor 60. Adjustment of the resistor 65 merely shifts the final slip speed frequency but does not materially affect the desirable frequency characteristics of the control circuit. It has been found that a variation of plus or minus twenty percent to the nominal slip speed of the motor is feasible by appropriate adjustment of the resistor 65.

It will therefore be seen that this invention provides a control circuit which provides a lower switching frequency with higher rotor currents to provide an increase in the starting torque and a decrease in the pull out speed, as compared to systems without such frequency control.

By way of explanation, and in no way intending to limit the scope of the invention as defined in the appended claims, a 1/60 horsepower shaded pole induction motor was employed having a one and one-half inch stator of 26 gauge laminations. A no load speed of 9300 r.p.m. was obtained and was controllable over a plus or minus five percent range by suitable adjustment of the resistor 65. With the frequency control of this invention applied, the stall torque was 1.0 inch ounces and the pull out torque was 3.6 inch ounces at 5000 r.p.m. When the motor was operated directly from the static inverter without the frequency control of this invention, the stall torque was approximately 0.75 in ounces and pull out occurred at 7500 r.p.m. at approximately 3.6 inch ounces. It has been observed that on such fractional horsepower shaded pole motors, the frequency control of this invention substantially reduces the pull out speed and increases the locked rotor torque.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. In a transistor converter circuit for operating a fractional horsepower induction motor on direct current providing higher starting torque and decreasing the pull out speed, the improvement comprising a source of D.C. power, a pair of driving transistors connected in push-pull relationship to the stator winding of the induction motor and to said source, a control winding magnetically coupled to said stator and to said transistor bases for switching said transistors alternately to conduction and cut off upon a predetermined flux saturation point in said stators, means for producing a signal which is a function of the current in said stator windings, and control means responsive to said signal producing means and connected to regulate the current through said transistors during conduction for varying the point at which the switching of said transistors occurs in relation to the saturation of the stator providing a lower switching frequency at higher stator currents.

2. In a transistor converter circuit for operating a fractional horsepower induction motor on direct current providing higher starting torque and decreased pull out speed, the improvement comprising a source of D.C. power, a pair of driving transistors connected in push-pull relationship to the stator winding of the induction motor and to said source, a control winding magnetically coupled to said stator and to said transistor bases for switching said transistors upon a predetermined flux saturation point in said stators, a current transformer connected to the stator leads for producing a signal which is a function of rotor slip speed, and control means responsive to said signal produced by said transformer and connected to regulate the current through said transistors for varying the point at which the switching of said transistors occurs in relation to the flux density in said stator providing a lower switching frequency at higher rotor slip speeds.

3. An induction motor drive circuit for operating an induction motor from a D.C. source, comprising a static converter having current control devices connected to the stator winding of said motor in driving relation thereto, and through said windings to a source of D.C. power, each of said current control devices having a control electrode, further winding means magnetically coupled to the stator of said induction motor and to said control electrodes and responsive to reversals in the flux density in said stator for effecting the alternate switching of said current control devices to effect the application of a substantially square wave voltage across the stator windings, means for lowering the frequency of the switching of said current control devices at high slip speeds of said rotor including means for sensing the current in said stator windings and providing a signal proportionate thereto, and a further current control device connected for operation in response to the magnitude of said signal and connected in the circuit including said control electrodes and said further winding means for causing a greater current flow through said control devices with increased slip speed resulting in a decrease in switching rate.

4. An induction motor drive circuit for operating an induction motor from a D.C. source, comprising a static converter having power transistors connected to the stator winding of said motor in driving relation thereto, and through said windings to a source of D.C. power, further winding means magnetically coupled to the stator of said induction motor and to said control electrodes and responsive to the flux density in said stator for effecting the alternate switching of said transistors to effect the application of a substantially square wave voltage from said source across the stator winding of said motor, means for lowering the frequency of the switching of said transistors at high slip speeds of said rotor including current transformer means for sensing the current in the stator windings and providing a D.C. signal proportionate thereto, and control circuit including a further transistor connected to control the current flow through said power transistors and controlled by said D.C. signal for increasing said current flow with increased stator current resulting in delayed switching of said power transistors in relation to the flux density in said stator.

5. An induction motor for operation from a D.C. source and having improved starting and torque pull out characteristics, comprising a shaded pole motor having a stator winding, an induction rotor, a static converter for said stator winding including a pair of transistors connected in push-pull relation through said stator winding to a D.C. source, further coil means on said stator connected to said transistor bases for switching said transistors alternately into conductive and cutoff states at predetermined flux saturation points of said stator at a repetitive rate which is determined by the drive of said transistors bases, means for decreasing said transistor switching rate at relatively high slip speeds of said rotor including a current sensor connected to provide a signal in proportion to the current in said stator winding, a frequency control transistor in circuit with said converter transistors for effecting variations in the drive of said converter transistors, and circuit means responsive to said signal and connected to said control transistor to effect conduction thereof to delay the point at which said converter transistors are caused to switch by said further coil means in relation to the flux density in said stator to decrease said switching rate with increased slip speed of said rotor.

6. An induction motor for operation from a D.C. source and having improved starting and torque pull out characteristics, comprising a shaded pole motor having a center tapped stator winding, an induction rotor, a static converter for said stator winding including a pair of transistors connected in push-pull relation through said stator winding and through the center tap to a D.C. source, further coil means on said stator connected to said transistor bases for switching said transistors alternately into conductive and cutoff states at predetermined flux saturation points of said stator at a repetitive rate which is determined by the drive of said inverter transistors, means for decreasing said transistor switching rate at relatively high slip speeds of said rotor including a current sensor connected to provide a D.C. signal in proportion to the average current in said stator winding, a frequency control transistor in said emitter circuit of said push-pull transistors for effecting variations in the drive thereof, and circuit means connected to control the conduction of said control transistor to vary the drive of said inverter transistors to decrease said switching rate thereof with increased slip speed of said rotor.

7. The method of operating an induction motor from a static direct current-to-square wave inverter having switching transistors in driving relation to the motor stator windings and a control winding for switching said transistors in response to static core saturation, comprising the steps of generating a signal proportional to rotor slip speed, and adjusting the point on the hysteresis curve at which switching of the static inverter transistors occurs by controlling the conduction of said transistors in accordance with said rotor slip speed signal to cause more drive current to flow through said transistors and said stator winding with increasing slip speed to drive the stator core further into magnetic saturation.

8. The method of operating an induction motor from a direct current source, comprising the steps of driving the stator windings with a square wave current derived from a transistorized inverter which switches in response to saturation of the stator core of the motor, and modifying the switching rate in accordance with rotor speed by generating a signal which is an inverse function of rotor speed, and modifying the drive current through the switching transistors in accordance with said signal to cause the stator core to be driven further into saturation before switching with decreasing rotor speed.

9. The method of operating an induction motor from a direct current source, comprising the steps of driving the stator windings with a square wave current derived from a transistorized inverter which switches in response to saturation of the stator core of the motor, generating a signal proportionate to the average current flow through the stator windings as an indication of rotor speed, and modifying the drive current through the switching transistors in accordance with said signal to drive said stator core to a higher flux density before switching to decrease the switching rate concurrently with a decrease in rotor speed.

References Cited by the Examiner

UNITED STATES PATENTS

| | | | |
|---|---|---|---|
| 2,814,769 | 11/1957 | Williams | 318—341 X |
| 3,083,326 | 3/1963 | Deming et al. | 318—138 |
| 3,090,897 | 5/1963 | Hammann | 318—138 |
| 3,098,958 | 7/1963 | Katz | 318—138 |
| 3,171,072 | 2/1965 | Adair | 318—254 X |

ORIS L. RADER, *Primary Examiner.*

G. Z. RUBINSON, *Assistant Examiner.*